United States Patent  (10) Patent No.: US 7,715,483 B2
Cho et al.  (45) Date of Patent: May 11, 2010

(54) APPARATUS AND METHOD FOR TRANSMITTING A SUB-CHANNEL SIGNAL IN A COMMUNICATION SYSTEM USING AN ORTHOGONAL FREQUENCY DIVISION MULTIPLE ACCESS SCHEME

(75) Inventors: Jae-Hee Cho, Seoul (KR); Jae-Ho Jeon, Seongnam-si (KR); Soon-Young Yoon, Seoul (KR); Sang-Hoon Sung, Suwon-si (KR); Ji-Ho Jang, Seoul (KR); In-Seok Hwang, Seoul (KR); Hoon Huh, Seongnam-si (KR); Jeong-Heon Kim, Anyang-si (KR); Seung-Joo Maeng, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1127 days.

(21) Appl. No.: 11/077,858

(22) Filed: Mar. 11, 2005

(65) Prior Publication Data

US 2005/0201477 A1 Sep. 15, 2005

(30) Foreign Application Priority Data

Mar. 12, 2004 (KR) .................. 10-2004-0017065
Apr. 12, 2004 (KR) .................. 10-2004-0025145

(51) Int. Cl.
 *H04L 27/28* (2006.01)
(52) U.S. Cl. .................. 375/260; 375/259; 375/267; 375/271; 375/293; 375/354; 370/205; 370/518; 370/524; 370/465
(58) Field of Classification Search ......... 375/135–137, 375/146, 220, 268, 279, 298, 300, 308, 346, 375/267, 259–260, 264, 306, 354, 355; 370/210, 370/208, 319, 478, 205, 503, 508, 518
See application file for complete search history.

(56) References Cited

U.S. PATENT DOCUMENTS 4,768,187 A 8/1988 Marshall (Continued)

FOREIGN PATENT DOCUMENTS

CA 2 344 117 10/2001

(Continued)

OTHER PUBLICATIONS

Samsung, Runcom, ETRI: "AMC Subcahannel Subcarrier Allocation Enhancements", IEEE 802.16 Broadband Wireless Access Working Group, Apr. 15, 2004.

(Continued)

*Primary Examiner*—Shuwang Liu
*Assistant Examiner*—Hirdepal Singh
(74) *Attorney, Agent, or Firm*—The Farrell Law Firm, LLP

(57) ABSTRACT

A method of allocating sub-channel signal interleaving patterns to BSs forming a wireless communication system that divides a frequency band into a plurality of sub-carriers and including a plurality of sub-channels, which are a set of predetermined adjacent sub-carriers. The method includes: creating a basic orthogonal sequence having a length identical to a number of the sub-carriers forming the sub-channel; creating a plurality of sequences having a same length as the basic orthogonal sequence by cyclic-shifting the basic orthogonal sequence a predetermined number of times or performing a modulo operation based on a number of the sub-carriers forming the sub-channel, after adding a predetermined offset to the cyclic-shifted basic orthogonal sequence; selecting a predetermined number of sequences corresponding to a number of the BSs from among the plurality of sequences; and allocating the selected sequences as the sub-channel signal interleaving patterns for the BSs.

9 Claims, 4 Drawing Sheets

U.S. PATENT DOCUMENTS

| | | | |
|---|---|---|---|
| 5,408,496 A | 4/1995 | Ritz et al. | |
| 5,619,493 A | 4/1997 | Ritz et al. | |
| 6,188,717 B1 | 2/2001 | Kaiser et al. | |
| 7,292,606 B2 * | 11/2007 | Li | 370/491 |
| 7,483,483 B2 * | 1/2009 | Lakkis | 375/238 |
| 2003/0053413 A1 | 3/2003 | Sawahashi et al. | |
| 2004/0001429 A1 * | 1/2004 | Ma et al. | 370/210 |
| 2004/0086027 A1 * | 5/2004 | Shattil | 375/146 |
| 2004/0131030 A1 * | 7/2004 | Kuroyanagi et al. | 370/335 |
| 2005/0135493 A1 * | 6/2005 | Maltsev et al. | 375/260 |
| 2005/0180349 A1 * | 8/2005 | Alamouti et al. | 370/319 |
| 2005/0185729 A1 * | 8/2005 | Mills | 375/267 |
| 2005/0207385 A1 * | 9/2005 | Gorokhov et al. | 370/344 |
| 2007/0177631 A1 * | 8/2007 | Popovic et al. | 370/478 |

FOREIGN PATENT DOCUMENTS

| | | |
|---|---|---|
| JP | 7-115408 | 5/1995 |
| JP | 2001-509339 | 7/2001 |
| JP | 2001-238269 | 8/2001 |
| JP | 2003-258757 | 9/2003 |
| RU | 2 119 255 | 9/1998 |
| WO | WO 98/33290 | 7/1998 |
| WO | WO 03/019837 | 3/2003 |

OTHER PUBLICATIONS

"OFDM Mode for the IEEE 802.16A PHY Draft Standard", IEEE 802.16.3C-01/59R2, May 17, 2001.

* cited by examiner

APPARATUS AND METHOD FOR TRANSMITTING A SUB-CHANNEL SIGNAL IN A COMMUNICATION SYSTEM USING AN ORTHOGONAL FREQUENCY DIVISION MULTIPLE ACCESS SCHEME

PRIORITY

This application claims priority under 35 U.S.C. § 119 to an application entitled "Apparatus And Method For Transmitting Sub-Channel Signal In Communication System Using Orthogonal Frequency Division Multiple Access Scheme" filed in the Korean Intellectual Property Office on Mar. 12, 2004 and assigned Serial No. 2004-17065, and an application entitled "Apparatus And Method for Transmitting Sub-Channel Signal In Communication System Using Orthogonal Frequency Division Multiple Access Scheme" filed in the Korean Intellectual Property Office on Apr. 12, 2004 and assigned Serial No. 2004-25145, the contents of both of which are incorporated herein by reference.

BACKGROUND OF THE INVENTION

1. Field of the Invention

The present invention relates generally to a communication system using an orthogonal frequency division multiple access (OFDMA) scheme. More particularly, the present invention relates to an apparatus and a method for transmitting a sub-channel signal while minimizing interference between adjacent cells.

2. Description of the Related Art

Recently, various studies and research have been performed for $4^{th}$ generation (4G) communication systems in order to provide subscribers with services having superior quality of service (QoS) at a higher transmission rate. In particular, many studies are being performed with the 4G communication systems in order to provide subscribers with high speed services by ensuring mobility and QoS to wireless local area network (LAN) communication systems and wireless metropolitan area network (MAN) communication systems, which can provide services at a relatively high rate.

In order to support a broadband transmission network for a physical channel of the wireless MAN communication system, an institute of electrical and electronics engineers (IEEE) 802.16a communication system using an orthogonal frequency division multiplexing (OFDM) scheme and an OFDMA scheme has been suggested. According to the IEEE 802.16a communication system, the OFDM/OFDMA schemes are applied to the wireless MAN system to transmit a physical channel signal using a plurality of sub-carriers with a high transmission rate.

The IEEE 802.16a communication system is based on a single cell structure without taking mobility of a subscriber station (SS) into consideration. Additionally, an IEEE 802.16e communication system, which takes mobility of the SS into consideration based on the IEEE 802.16a communication system, has been suggested. The IEEE 802.16e communication system considers the mobility of the SS under a multi-cell environment. In order to permit the mobility of the SS under the multi-cell environment, operational relationship between the SS and a base station (BS) must be changed. Accordingly, studies have been performed with a handover of the SS in order to support the mobility of the SS under a multi-cell structure. Herein, the SS having the mobility is called a mobile subscriber station (MSS).

FIG. 1 is a schematic view illustrating a conventional IEEE 802.16e communication system. Referring to FIG. 1, the conventional IEEE 802.16e communication system has a multi-cell structure including a cell 100 and a cell 150. The conventional IEEE 802.16e communication system includes a BS 110 for managing the cell 100, a BS 140 for managing the cell 150, and a plurality of MSSs 111, 113, 130, 151, and 153. The BSs 110 and 140 communicate with the MSSs 111, 113, 130, 151, and 153 using the OFDM/OFDMA scheme.

The conventional IEEE 802.16e communication system performs an inverse fast Fourier transform (IFFT). For example, the conventional IEEE 802.16e communication system uses 1702 sub-carriers. Among the 1702 sub-carriers, 166 sub-carriers are used as pilot sub-carriers and 1536 sub-carriers are used as data sub-carriers. In addition, the 1536 sub-carriers are divided into 32 sub-channels including 48 sub-carriers, respectively. The sub-channels are allocated to the MSSs according to the state of the system. Herein, the sub-channel signifies a channel including at least one sub-carrier. For example, 48 sub-carriers may form one sub-channel.

The sub-channel can be formed through two schemes in the conventional IEEE 802.16e communication system.

According to the first scheme, the sub-carriers forming the sub-channels are dispersed over all frequency bands of the sub-carriers. In particular, sub-carriers are dispersed over the entire frequency band of the data sub-carriers, thereby obtaining a frequency diversity gain.

According to the second scheme, the sub-carriers forming the sub-channels are aligned in the form of adjacent sub-carriers without being dispersed over all frequency bands of the sub-carriers.

If the sub-channels are formed according to the second scheme, adjacent cells may use the same sub-channel in the same unit time slot. Herein, the same sub-channel signifies the sub-channels including the sub-carriers having the same frequency band. That is, as described with reference to FIG. 1, two adjacent cells (cells 100 and 150) may use the same sub-channel in the same unit time slot.

More specifically, if cells 100 and 150 select the same sub-channel and the same modulation and coding scheme (MCS) is applied to the same sub-channel, the MSS 130, which is located in a cell boundary area, can receive the signal from the BS 110, and also from the BS 140, if the signal has high strength. For example, if the signal has a high carrier to interference and noise ratio (CINR), the MSS 130 receives the signal and demodulates the signal into information data.

If the conventional IEEE 802.16e communication system having a frequency reuse factor of 1 forms the sub-channels according to the second scheme, the sub-channels of the cells forming the conventional IEEE 802.16e communication system have the same frequency band. If the same MCS is applied to the sub-channels of the cells, the MSS located in the cell boundary area can receive the sub-channel signals not only from the BS of the MSS, but also from other BS. As a result, the MSS may receive the sub-channel signal having the higher interference component. Accordingly, it is necessary to provide an apparatus and a method for transceiving the sub-channel signal, while minimizing interference between adjacent cells.

SUMMARY OF THE INVENTION

Accordingly, the present invention has been designed to solve the above and other problems occurring in the prior art. An object of the present invention is to provide an apparatus and a method for transmitting a sub-channel signal in an OFDMA communication system.

Another object of the present invention is to provide an apparatus and a method for interleaving a sub-channel signal in such a manner that sub-channels having adjacent sub-carriers can be differentiated from each other according to BSs thereof in an OFDMA communication system.

In order to accomplish the above and other objects, according to a first aspect of the present invention, there is provided a method of allocating sub-channel signal interleaving patterns to base stations (BSs) forming a wireless communication system capable of dividing a frequency band into a plurality of sub-carriers and including a plurality of sub-channels, which are a set of predetermined adjacent sub-carriers. The method comprises the steps of creating a basic orthogonal sequence having a length identical to a number of the sub-carriers forming the sub-channel; creating a plurality of sequences having lengths identical to the length of the basic orthogonal sequence by one of cyclic-shifting the basic orthogonal sequence a predetermined number of times and through performing a modulo operation based on a number of the sub-carriers forming the sub-channel, after adding a predetermined offset to the basic orthogonal sequence, which has been cyclic-shifted the predetermined number of times; selecting a predetermined number of sequences corresponding to a number of the BSs from among the plurality of sequences; and allocating the selected sequences as the sub-channel signal interleaving patterns for the BSs.

According to another aspect of the present invention, there is provided a method of allocating sub-channel signal interleaving patterns to base stations (BSs) forming a wireless communication system capable of dividing a frequency band into a plurality of sub-carriers and including a plurality of sub-channels, which are a set of predetermined adjacent sub-carriers. The method comprises the steps of creating a basic orthogonal sequence having a length identical to a number of the sub-carriers forming the sub-channel; creating a plurality of sequences having lengths identical to the length of the basic orthogonal sequence by applying a predetermined offset to the basic orthogonal sequence, after cyclic-shifting the basic orthogonal sequence a predetermined number of times; selecting a predetermined number of sequences corresponding to a number of the BSs from among the plurality of sequences; and allocating the selected sequences as the sub-channel signal interleaving patterns for the BSs.

According to another aspect of the present invention, there is provided a method of transmitting a sub-channel signal in a wireless communication system capable of dividing a frequency band into a plurality of sub-carriers and including a plurality of sub-channels, which are a set of predetermined adjacent sub-carriers. The method comprises the steps of creating coded bits by encoding information data to be transmitted through a predetermined coding scheme; creating a modulation symbol array by modulating the coded bits according to a predetermined modulation scheme; interleaving the modulation symbol array according to a predetermined sub-channel signal interleaving pattern; allocating the interleaved modulation symbol array to predetermined sub-channels; and transmitting the sub-channel signal, after performing an inverse fast Fourier transform (IFFT) process and an RF processing process with respect to the sub-channel signal.

According to another aspect of the present invention, there is provided an apparatus for transmitting a sub-channel signal in a wireless communication system capable of dividing a frequency band into a plurality of sub-carriers and including a plurality of sub-channels, which are a set of predetermined adjacent sub-carriers. The apparatus comprises an encoder for creating coded bits by encoding information data to be transmitted through a predetermined coding scheme; a symbol mapper for creating a modulation symbol array by modulating the coded bits according to a predetermined modulation scheme; a sub-channel allocator for interleaving the modulation symbol array according to a predetermined sub-channel signal interleaving pattern and for allocating the interleaved modulation symbol array to predetermined sub-channels; and a transmitter for transmitting the sub-channel signal, after performing an inverse fast Fourier transform (IFFT) process and an RF processing process with respect to the sub-channel signal.

According to another aspect of the present invention, there is provided a method of interleaving sub-channel signals for base stations (BSs) forming a wireless communication system capable of dividing a frequency band into a plurality of sub-carriers and including a plurality of sub-channels, which are a set of predetermined adjacent sub-carriers. The method comprises the steps of: creating a plurality of sub-channel signal interleaving patterns, which are different from each other and have a length identical to a number of sub-carriers forming the sub-channels; and allocating the interleaving patterns to the BSs such that the sub-channel signal is interleaved.

According to another aspect of the present invention, there is provided a method of allocating sub-channel signal interleaving patterns to base stations (BSs) in a wireless communication system capable of dividing a frequency band into a plurality of sub-carriers and including a plurality of sub-channels, which are a set of predetermined adjacent sub-carriers. The method comprises the steps of: creating a plurality of sequences having length identical to the length of a basic sequence which has a length identical to a number of data sub-carriers forming a sub-channel by applying a predetermined offset to the basic sequence and cyclic-shifting the basic sequence a predetermined number of times; allocating the created a plurality of sequences as the sub-channel signal interleaving patterns for the BSs.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Preferred embodiments of the present invention will be described in detail herein below with reference to the accompanying drawings. In the following detailed description, a detailed description of known functions and configurations incorporated herein will be omitted when it may obscure the subject matter of the present invention.

The present invention is directed to an orthogonal frequency division multiple access (OFDMA) communication system. More specifically, the present invention suggests an interleaving scheme for a sub-channel signal capable of minimizing interference between adjacent cells in an institute of electrical and electronics engineers (IEEE) 802.16e communication system. That is, the present invention suggests an interleaving scheme for a sub-channel signal capable of minimizing interference between adjacent cells when the IEEE 802.16e communication system has a frequency reuse factor of 1, i.e., when cells forming the IEEE 802.16e communication system use the same frequency band.

It should also be noted that although the present invention will be described in relation to the IEEE 802.16e communication system, the interleaving scheme for the sub-channel according to the present invention is applicable for other systems using the OFDMA scheme.

Figure 1:
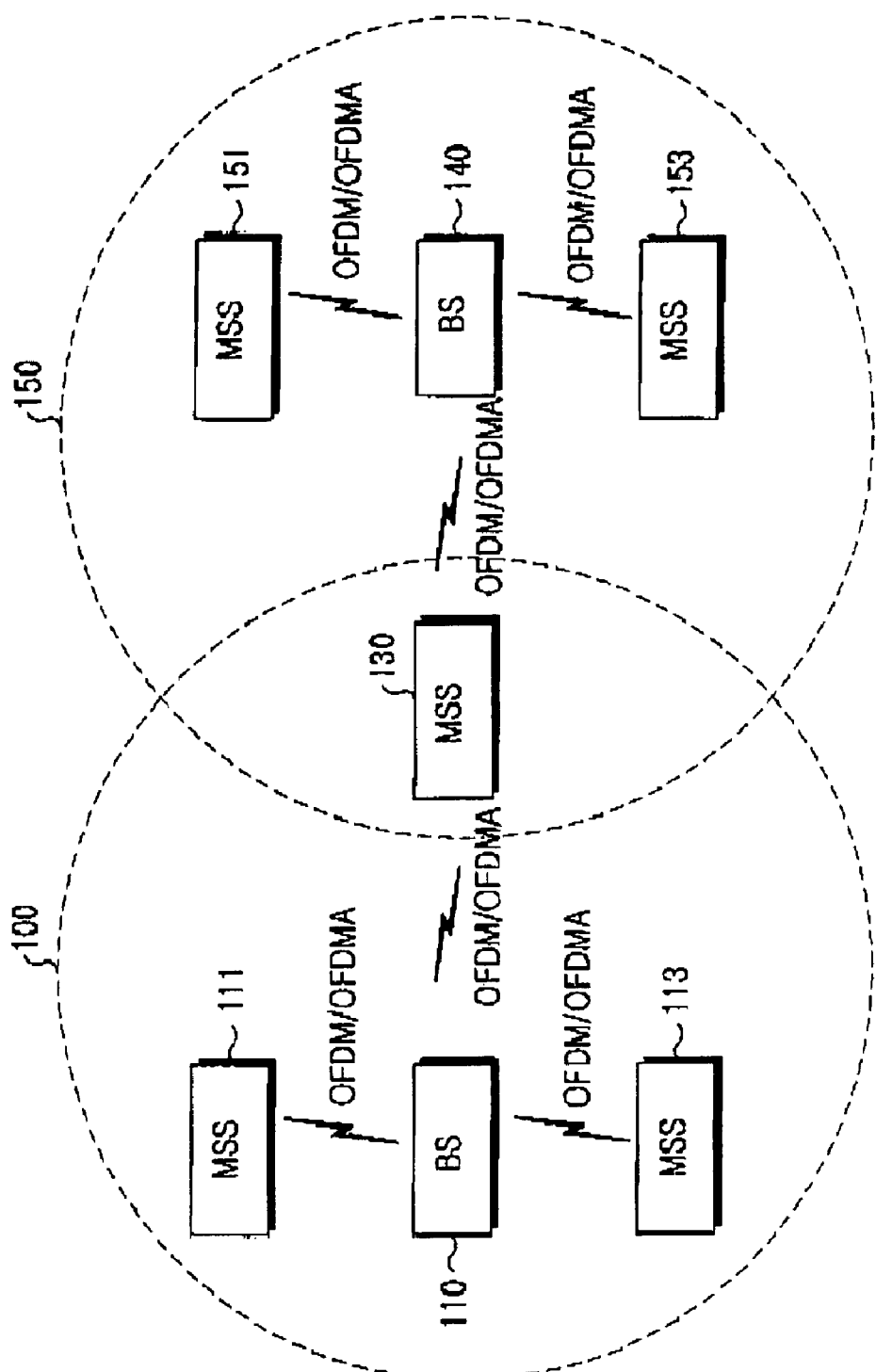
FIG. 1 is a schematic view illustrating a conventional IEEE 802.16e communication system.
Figure 2:
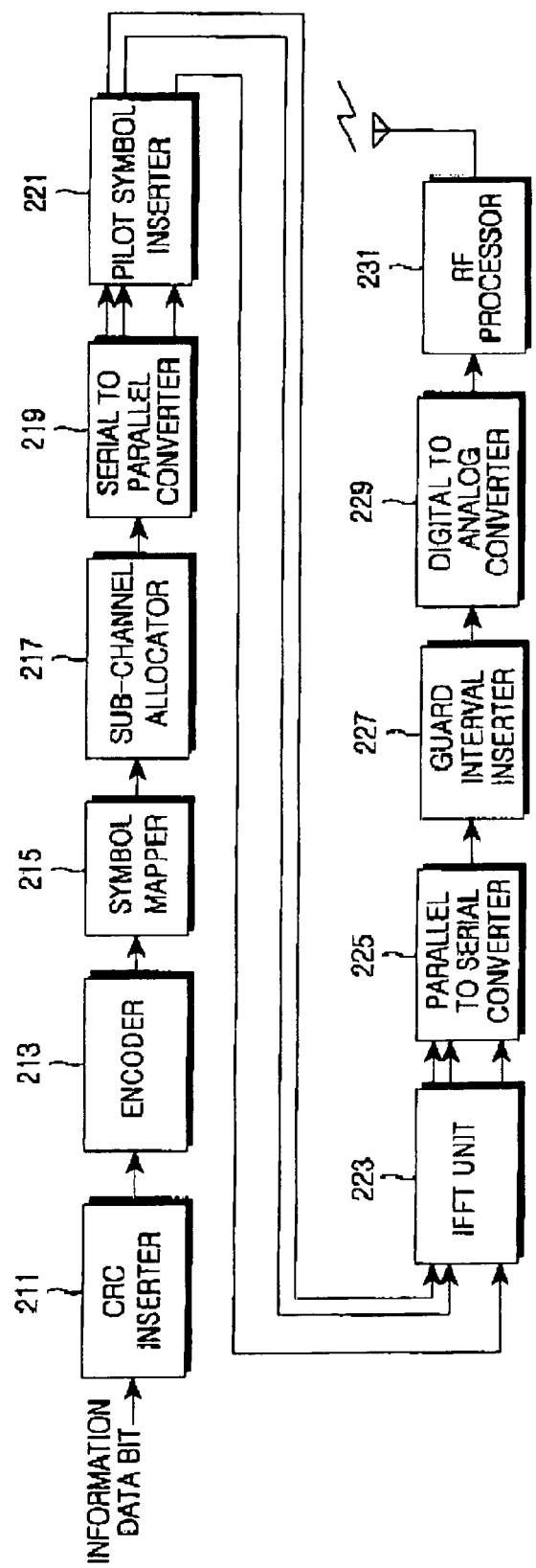
FIG. 2 is a schematic view illustrating a transmitter for an IEEE 802.16e communication system according to an embodiment of the present invention.

FIG. 2 is a schematic view illustrating a transmitter for an IEEE 802.16e communication system according to an embodiment of the present invention. Referring to FIG. 2, the transmitter includes a cyclic redundancy check (CRC) inserter 211, an encoder 213, a symbol mapper 215, a sub-channel allocator 217, a serial to parallel converter 219, a pilot symbol inserter 221, an inverse fast Fourier transform (IFFT) unit 223, a parallel to serial converter 225, a guard interval inserter 227, a digital to analog converter 229, and a radio frequency (RF) processor 231.

When user data bits and control data bits to be transmitted are generated, the user data bits and control data bits are input into the CRC inserter 211. Herein, the user data bits and control data bits are called "information data bits". The CRC inserter 211 inserts a CRC bit into the information data bits and outputs the information data bits to the encoder 213.

Upon receiving the signal from the CRC inserter 211, the encoder 213 codes the signal through a predetermined coding scheme and outputs the coded signal to the symbol mapper 215. Herein, the predetermined coding scheme includes a turbo coding scheme having a predetermined coding rate or a convolutional coding scheme.

The symbol mapper 215 modulates the coded bits output from the encoder 213 through a predetermined modulation scheme, thereby forming a modulation symbol. The modulation symbol is output to the sub-channel allocator 217. Herein, the predetermined modulation scheme includes a quadrature phase shift keying (QPSK) scheme or a 16 quadrature amplitude modulation (QAM) scheme.

The sub-channel allocator 217 receives the modulation symbols from the symbol mapper 215, allocates the modulation symbols to the sub-channels, and outputs the modulation symbols to the serial to parallel converter 219. The sub-channel allocator 217 allocates the sub-channels to the modulation symbols through a predetermined scheme. That is, because the IEEE 802.16e communication system has a frequency reuse factor of 1, the sub-channel allocator 217 allocates the sub-channels to the modulation symbols, after interleaving the sub-channel signal, such that interference between adjacent cells can be minimized. This allocation scheme will be described later in detail.

Upon receiving the serial modulation symbols having the sub-channels from the sub-channel allocator 217, the serial to parallel converter 219 parallel-converts the modulation symbols and outputs the modulation symbols to the pilot symbol inserter 221. The pilot symbol inserter 221 inserts pilot symbols into the parallel modulation symbols and outputs the parallel modulation symbols to the IFFT unit 223. The IFFT unit 223 receiving the signal output from the pilot symbol inserter 221 performs an N-point IFFT with respect to the signal and sends the signal to the parallel to serial converter 225.

Upon receiving the parallel signal from the IFFT unit 223, the parallel to serial converter 225 converts parallel signal into the serial signal and outputs the serial signal to the guard interval inserter 227. After receiving the serial signal output from the parallel to serial converter 225, the guard interval inserter 227 inserts a guard interval signal into the serial signal and outputs the serial signal to the digital to analog converter 229. Herein, the guard interval is used for removing interference between orthogonal frequency division multiplexing (OFDM) symbols, which have been transmitted in previous OFDM symbol time, and OFDM symbols to be transmitted in present OFDM symbol time when an OFDMA communication system transmits the OFDM symbols.

In addition, the guard interval can be inserted into the OFDM symbol through a cyclic prefix scheme, in which predetermined final samples of the OFDM symbols in a time domain are copied and the copied samples are inserted into effective OFDM symbols, or through a cyclic postfix scheme, in which predetermined fore samples of the OFDM symbols in the time domain are copied and the copied samples are inserted into effective OFDM symbols.

After receiving the signal from the guard interval inserter 227, the digital to analog converter 229 converts the signal into an analog signal and outputs the analog signal to the RF processor 231. The RF processor 231 includes a filter and a front end unit, and transmits the analog signal through a transmission antenna, after RF-processing the analog signal.

Figure 3:
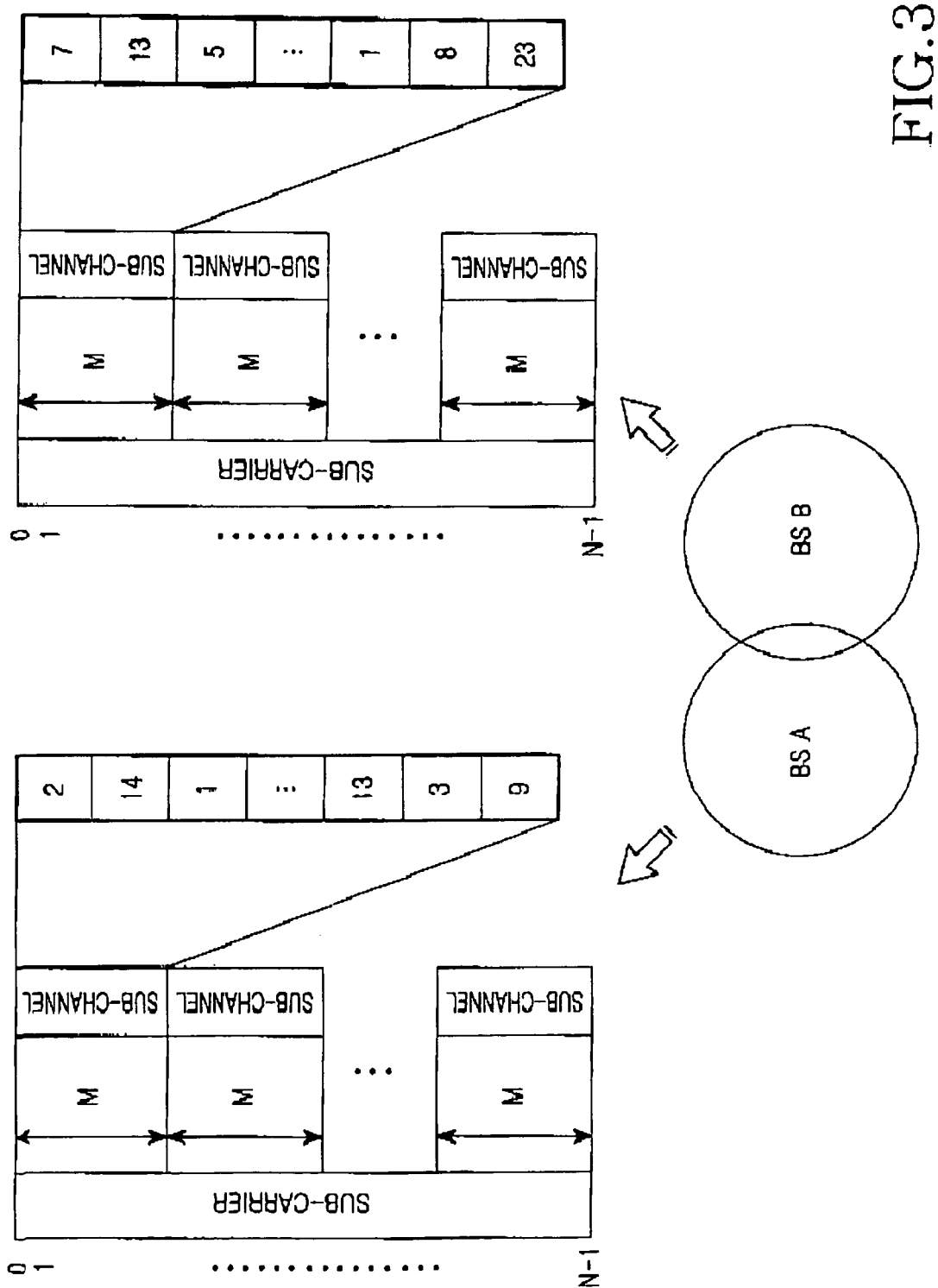
FIG. 3 is a schematic view illustrating an interleaving procedure for a sub-channel signal in an IEEE 802.16e communication system according to an embodiment of the present invention.

FIG. 3 is a schematic view illustrating an interleaving procedure for the sub-channel signal in the IEEE 802.16e communication system according to an embodiment of the present invention. However, prior to explaining FIG. 3, it should be noted that the frequency reuse factor of 1 is applied to the IEEE 802.16e communication system. In addition, each of the sub-channels allocated from cells, that is, allocated from base stations (BSs) of the IEEE 802.16e communication system consists of a plurality of adjacent sub-carriers.

As described above, the sub-channel can be formed by dispersing 48 sub-carriers over the frequency bands of the IEEE 802.16e communication system, or by aligning the sub-carriers in the form of adjacent sub-carriers, such that 48 adjacent sub-carriers may form one sub-channel.

According to the present invention, the sub-channel is formed using the adjacent sub-carriers. In this case, as described above, the adjacent cells select the sub-channels having the same frequency band. If the same MCS is applied to the selected sub-channels, the sub-channel signals transmitted from one cell may act as interference signals with respect to other cell. Therefore, a problem may occur when restoring the signals that have been transmitted from each BS. That is, even if BSs transmit the signals with sufficient redundancy by taking interference of adjacent BSs into consideration, a subscriber station (SS) communicating with a corresponding BS may restore a signal having higher strength between a signal transmitted from the corresponding BS and an interference signal.

The sufficient redundancy signifies a predetermined condition for restoring an original transmission signal when noise identical to the interference is received together with the signal instead of the interference signal to which the same MCS is applied.

The reason for decoding the signal having higher strength between the receiving signal and the interference signal can be found from the characteristics of the decoder of the SS.

The decoder of each SS is a system capable of selecting a codeword similar to a receiving signal from among all codewords available in a predetermined coding system. Accordingly, if the same MCS is applied to the same sub-channels, the decoder of each SS cannot detect the codeword transmitted from the BS making communication with the SS. As a result, the decoder only detects the codeword included in the receiving signal having highest strength. Accordingly, the SS cannot communicate with the corresponding BS.

In order to solve this problem, the decoder is designed such that it regards only codewords transmitted from the corresponding BS as codewords generated from the coding system. Therefore, according to the present invention, the sub-channel has a function capable of distinguishing the BSs thereof. That is, although the sub-channel of each BS includes the same sub-carriers, it is possible to vary a mapping order of the symbol to the sub-carriers to enable the sub-channel to have the BS distinguishing function.

According to the present invention, the sub-channel signal is transmitted while mapping the sub-channel signal with the sub-channel, after interleaving the sub-channel signal to be transmitted, thereby preventing the sub-channel signal from operating as the interference signal to the adjacent cells.

FIG. 3 illustrates the interleaving scheme for the sub-channel signal used for a predetermined BS A and the interleaving scheme for the sub-channel signal used for the other BS B, which is adjacent to the BS A. It is assumed that the BSs A and B utilize N sub-carriers in which M adjacent sub-carriers form one sub-channel in a time-frequency domain. Herein, the N sub-carriers refer to a set of sub-carriers for K OFDM symbols, where K is a predetermined positive integer.

Because the IEEE 802.16e communication system has a frequency reuse factor of 1 and forms the sub-channel by using the adjacent sub-carriers, positions of the sub-carriers forming the $n^{th}$ sub-channel in the BSs A and B may be identical to each other. In this case, because the sub-carriers forming the $n^{th}$ sub-channel in the BSs A and B have the same frequency band, the sub-channel signal is interleaved. Accordingly, the mapping order of the sub-carrier for data symbols forming the $n^{th}$ sub-channel signal of the BSs A and B, that is, the mapping order of the sub-carrier for modulation symbols, can be formed differently, depending on the modulation symbols.

For example, if the IEEE 802.16e communication system utilizes 1702 sub-carriers, it is assumed that 166 sub-carriers are used as pilot sub-carriers, 1536 sub-carriers are used as data sub-carriers, and the 1536 data sub-carriers are divided into 32 sub-channels including 48 data sub-carriers, respectively. Accordingly, one sub-channel includes 48 data sub-carriers.

Each sub-channel of the BSs A and B includes 48 data sub-carriers, including first to forty eighth data sub-carriers, in which the 48 sub-carriers have the same frequency band. In addition, assuming that the signal mapped with each sub-carrier is the modulation symbol, the sub-channel signal including 48 modulation symbols is transmitted through one sub-channel. Accordingly, the interleaving pattern of the sub-channel signal for the BS A is set differently from the interleaving pattern of the sub-channel signal for the BS B, thereby preventing the sub-channel signal transmitted from the adjacent BS from operating as the interference signal. Herein, the interleaving pattern for the sub-channel signal is referred to as a "sub-channel signal interleaving pattern".

As illustrated in FIG. 3, according to the sub-channel signal interleaving pattern of the BS A, 48 modulation symbols are sequentially mapped with the sub-carriers of $\{2, 14, 1, \ldots, 13, 3, 9\}$. In addition, according to the sub-channel signal interleaving pattern of the BS B, 48 modulation symbols are sequentially mapped with the sub-carriers of $\{7, 13, 5, \ldots, 1, 8, 23\}$.

The sub-channel signal interleaving patterns must be set differently from each other depending on the BSs forming the IEEE 802.16e communication system. Accordingly, the following matters must be considered when setting the sub-channel signal interleaving patterns.

First, because one sub-channel includes M data sub-carriers, the mapping order of the sub-carrier for the modulation symbols transmitted through the sub-channel, that is, the sub-channel signal interleaving pattern, is set using a sequence having a length M including elements $\{0, 1, \ldots, M-1\}$. Each of the elements $\{0, 1, \ldots, M-1\}$ is used once in the sequence having the length M. The sub-channel signal interleaving pattern can be determined through various schemes as described below by using the sequence having the length M.

(1) Random Search Scheme (1-1) The sub-channel signal interleaving pattern can be determined by using an orthogonal sequence having a length M.

As described above, one sub-channel includes M data sub-carriers, such that it is possible to create orthogonal sequences having the length M. Herein, the orthogonal sequence signifies a sequence, in which the same elements does not exist in the same location when selecting two sequences from among orthogonal sequences having the length M.

In addition, the orthogonal sequence having the length M can be created through various schemes as described below.

First, orthogonal sequences having the length M, which are orthogonal to each other, can be created by enabling the sequence of $\{0, 1, \ldots, M-1\}$ to undergo a cyclic shift by $[0, M-1]$ times.

Second, orthogonal sequences having the length M can be created through a computer simulation. Each of the orthogonal sequences having the length M created through the above first and second schemes is allocated as an interleaving pattern for each sub-channel signal of each BS, thereby preventing the signal of each BS from operating as the interference signal of the adjacent BS.

(1-2) The sub-channel signal interleaving pattern can be determined by using a non-orthogonal sequence having a length M.

If the number C of the BSs forming the IEEE 802.16e communication system is larger than the length M of the sequence, the number of the orthogonal sequences is less than the number C of the BSs, thereby making it impossible to distinguish all BSs by using the orthogonal sequence. Accordingly, a larger amount of non-orthogonal sequence is created by attenuating orthogonality of the orthogonal sequence, thereby distinguishing the BSs from each other. That is, there are provided M! sequences having the length M including elements $\{0, 1, \ldots, M-1\}$, in which each of the elements $\{0, 1, \ldots, M-1\}$ is used once in the sequence.

In this case, when selecting two sequences from among M! sequences, it is possible to select the sequences corresponding to the number C of the BSs in which the sequences include a predetermined number of sub-carriers having collision characteristics less than H sub-carriers. In particular, if the number of sequences including a predetermined number of sub-carriers having collision characteristics less than H sub-carriers exceeds the number C of BSs, it is possible to select the sequence in such a manner that the BSs can be distinguished in an ascending order based on the number of sub-carriers having the collision characteristics.

The non-orthogonal sequences having the length M can be created through the computer simulation. Each of the non-orthogonal sequences having the length M is allocated through the interleaving pattern of the sub-channel signal of each BS, thereby preventing the signal of each BS from operating as the interference signal of the adjacent BS.

(2) Cyclic Shift and Modulo Addition Scheme

Among orthogonal sequences having a length M including elements $\{0, 1, \ldots, M-1\}$, in which each of the elements $\{0, 1, \ldots, M-1\}$ is used once in the sequence, a predetermined orthogonal sequence $S_0$ is defined as a basic orthogonal sequence. It is possible to create $M^2$ sequences using the basic orthogonal sequence $S_0$. Hereinafter, a method for creating the $M^2$ sequences will be described.

First, it is assumed that a sequence $S_f^g$ has a predetermined remainder after cyclic-shifting the basic orthogonal sequence $S_0$ f times and dividing each element of the basic orthogonal sequence $S_0$ by M, while adding an offset g to the element, in which f and g have an integer value existing within a range of [0,M−1]. That is, sequence $S_f^g$ can be obtained through a modulo operation by using M. Accordingly, it is possible to create total $M^2$ sequences $S_f^g$. The sequences, which undergo the cyclic shift by f times with the same offset g, have orthogonality to each other. The sequences having parameters g and f of different values may enable collision between elements of the sequences.

The interleaving pattern of the sub-channel signal for each BS can be determined using the $M^2$ orthogonal sequences. In general, the maximum number C of BSs forming the IEEE 802.16e communication system is limited to several hundreds. Therefore, it is possible to allocate the sub-channel signal interleaving pattern if the M has an integer value more than 20.

In addition, if the number C of the BSs is less than $M^2$, as described above, the sequences including a relatively smaller number of sub-carriers having the collision characteristics can be selected for allocating the interleaving pattern of the sub-channel signal for the C BSs.

The sub-channel signal interleaving pattern can be determined according to the schemes for selecting the basic orthogonal sequence $S_0$. Hereinafter, the schemes for selecting the basic orthogonal sequence $S_0$ will be described.

First, the basic orthogonal sequence $S_0$ is selected in such a manner that the number of sub-carriers having the collision characteristics can be minimized in each of the $M^2$ sequences. That is, C sequences are selected corresponding to the number C of BSs in which the C sequences include a predetermined number of sub-carriers, which may present collision characteristics when selecting two sequences from among the $M^2$ sequences, less than H sub-carriers. The selected C sequences are formed as a sequence sub-set. As described above, the C sequences that form the sequence sub-set can be selected through the computer simulation.

(3) Reed Solomon Sequence Scheme

When $M=Q^p-1$, wherein Q is a decimal and p is an integer, the sub-channel signal interleaving pattern can be determined using a Reed Solomon sequence defined in a Galois Field (GF, $Q^p$). If the sub-channel signal interleaving pattern is determined using the Reed Solomon sequence, the Reed Solomon sequence may include a maximum of three sub-carriers having the collision characteristics. Herein, $j^{th}$ element of the Reed Solomon sequence is represented as $P_f^g(j)$, which satisfies Equation (1).

$$P_f^g(j) = \begin{cases} P_f(j) + g & P_f(j) + g \neq 0 \\ g & P_f(j) + g = 0 \end{cases} \quad (1)$$

In Equation (1), $P_0$ represents a basic orthogonal sequence in the GF ($Q^p$), and $P_f(j)$ represents a $j^{th}$ element of a cyclic shift orthogonal sequence, which is created through cyclic-shifting $P_0$ in the left direction by f. In addition, $P_f^g(j)$ is a $j^{th}$ element of a sequence representing the sub-channel signal interleaving pattern. The addition operation in Equation (1) represents the addition operation in the GF ($Q^p$). In addition, the total M(M+1) sequences used for distinguishing the BSs are determined depending on the determination schemes for parameters f and g.

According to the present invention, the parameters f and g are determined through one of following three schemes.

According to a first scheme, the parameter f has a predetermined integer value selected from a predetermined integer range between 0 and M−1. In addition, the parameter g has a predetermined integer value selected from a predetermined integer range between 0 and M.

The sub-channel signal interleaving pattern is allocated to the BSs through the following manner.

The sub-channel signal interleaving pattern is adapted for M orthogonal sequences and C to M sequences including a predetermined number of sub-carriers having collision characteristics less than H sub-carriers.

First, predetermined serial numbers 0 to C−1 are allocated to the C sequences. That is, the sequences having a predetermined remainder after dividing indexes of C BSs by C (C-modulo operation) are allocated to the C BSs. Herein, an index of a BS is an index assigned uniquely to the BS in the OFDMA communication system, so the OFDMA communication system assigns indexes to a plurality of BSs of the OFDMA communication system.

Second, among C sequences, the number of sequences orthogonal to each other is set smaller than the number of sequence representing the collision characteristics, thereby allocating the sequences having the predetermined remainder, after dividing the indexes of the BSs by C (C-modulo operation) to each BS.

Third, a system is designed in such a manner that the BSs having the same remainder, after dividing the indexes of the BSs by C (C-modulo operation), are spaced from each other.

According to the second scheme, the parameters f and g are determined using Equation (2).

$$f = c\_id \bmod \text{PERM} \quad (2)$$

$$g = \left(\left\lfloor \frac{c\_id}{\text{PERM}} \right\rfloor\right) \bmod \text{OFFSET}$$

In Equation (2), a parameter PERM represents M (PERM=M), and a parameter OFFSET represents M+1 (OFFSET=M+1). In addition, $\lfloor x \rfloor$ represents a maximum integer value which is not larger than x, c_id represents a index of the BS, and mod represents a modulo operation.

According to the third scheme, the parameters f and g are determined by Equation (3).

$$f = \left(\left\lfloor \frac{c\_id}{OFFSET} \right\rfloor\right) \bmod PERM \quad (3)$$

$$g = c\_id \bmod OFFSET$$

In Equation (3), parameters PERM and OFFSET have the values identical to those defined in Equation (2).

According to the above three schemes, the sub-channel signal interleaving pattern for each BS is determined by using M(M+1) orthogonal sequences which satisfy Equation 1.

If the number C of the BSs is less than M(M+1), as described above, the orthogonal sequences including a relatively smaller number of sub-carriers having the collision characteristics are selected to allocate the sub-channel signal interleaving pattern for each of C BSs.

Hereinafter, a procedure of allocating the sub-channel signal interleaving pattern when the number M of data sub-carriers forming one sub-channel is 48 (M=48).

As described above, a predetermined Reed Solomon sequence is selected from among Reed Solomon sequences having the length $M=48=Q^2-1$ (Q=7) as a basic orthogonal sequence $P_0$, thereby creating 48×49 sequences including a maximum of three sub-carriers having the collision characteristics. Herein, the basic orthogonal sequence $P_0$ can be represented as shown below through septenary notation in Equation (4).

$$P_0 = \{01, 22, 46, 52, 42, 41, 26, 50, 05, 33, 62, 43, 63,$$
$$65, 32, 40, 04, 11, 23, 61, 21, 24, 13, 60, 06, 55,$$
$$31, 25, 35, 36, 51, 20, 02, 44, 15, 34, 14, 12, 45,$$
$$30, 03, 66, 54, 16, 56, 53, 64, 10\} \quad (4)$$

In addition, the 48×49 sequences are allocated to each BS according to the above three schemes.

Figure 4:
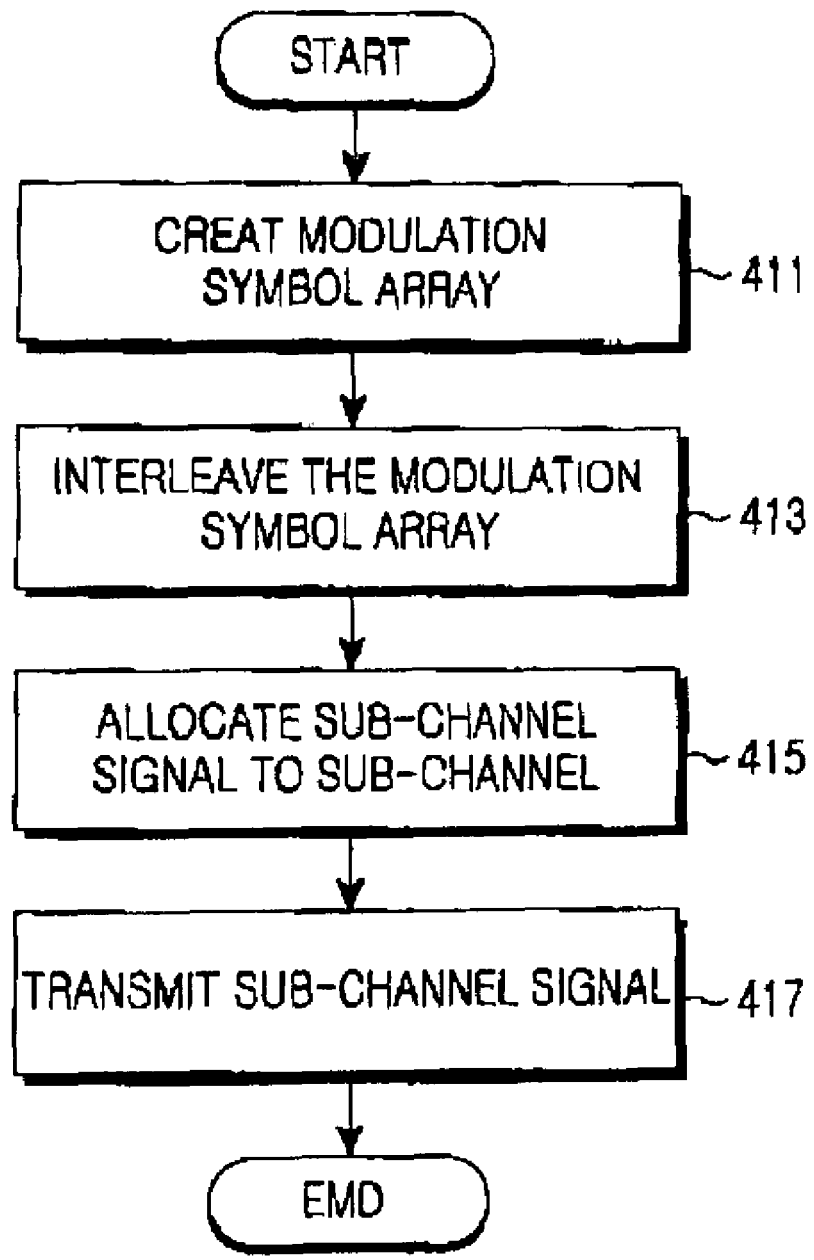
FIG. 4 is a flowchart illustrating a procedure for transmitting a sub-channel signal in an IEEE 802.16e communication system according to an embodiment of the present invention.

FIG. 4 is a schematic view illustrating a procedure for transmitting the sub-channel signal in the IEEE 802.16e communication system according to an embodiment of the present invention. Referring to FIG. 4, when information data to be transmitted is generated, as described with reference to FIG. 2, the transmitter creates a modulation symbol array by performing the CRC bit insertion, encoding, and symbol mapping processes with respect to the information data in step 411. The transmitter interleaves the modulation symbol array according to the sub-channel signal interleaving pattern, which has been preset in the transmitter, in step 413. Because the schemes for determining the sub-channel signal interleaving pattern have already been described above, they will not again be described below.

In step 415, the transmitter allocates the interleaved sub-channel signal to the corresponding sub-channel, that is, to the sub-carriers forming the corresponding sub-channel. In step 417, the transmitter transmits the sub-channel signal, thereby completing the procedure for transmitting the sub-channel signal.

As described above with reference to FIG. 2, the sub-channel signal transmission procedure includes the steps of converting the serial signal allocated to the sub-channel to the parallel signal, inserting the pilot symbol into the parallel signal, performing the IFFT with respect to the parallel signal, converting the parallel signal into the serial signal, inserting the guard interval into the serial signal, converting the serial signal into the analog signal, and RF-processing the analog signal.

Although the present invention has been described in relation to the schemes for determining the sub-channel signal interleaving pattern, the present invention is also applicable for changing the mapping position of the sub-carriers because the process for interleaving of the sub-channel signal according to the interleaving pattern is substantially identical to the process for changing the position of the sub-carriers forming the sub-channel. That is, according to the present invention, the sub-channel signal interleaving pattern can be replaced with the mapping pattern of the sub-carriers forming the sub-channel.

As described above, according to the present invention, the sub-channel signals allocated with the same frequency band to adjacent cells in the OFDMA communication system are transmitted by interleaving the sub-channel signals according to the sub-channel signal interleaving pattern, such that interference caused by the sub-channel signal of the adjacent cell can be minimized, thereby improving system performance.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method of allocating sub-channel signal interleaving patterns to Base Stations (BSs) forming a wireless communication system capable of dividing a frequency band into a plurality of sub-carriers and including a plurality of sub-channels, which are a set of predetermined adjacent sub-carriers, the method comprising the steps of:

creating a basic orthogonal sequence having a length identical to a number of the sub-carriers forming a sub-channel;

creating a plurality of sequences having lengths identical to the length of the basic orthogonal sequence by applying, to the basic sequence, a predetermined offset and a predetermined number of cyclic shifting times;

selecting a predetermined number of sequences corresponding to a number of the BSs from among the plurality of sequences; and allocating the selected sequences, wherein the step of applying the predetermined offset and the cyclic-shifting is determined according to:

$$P_f^g(j) = \begin{cases} P_f(j) + g & P_f(j) + g \neq 0 \\ g & P_f(j) + g = 0 \end{cases}$$

wherein, $P_f^g(j)$ is a $j^{th}$ element of a sequence, $P_f(j)$ represents a $j^{th}$ element of a cyclic shift orthogonal sequence, which is created through cyclic-shifting the basic orthogonal sequence in a left direction by f times, f is a predetermined integer value selected from 0 to M−1, g is the predetermined offset having a predetermined integer value from 0 to M, and M is a number of the sub-carriers forming the sub-channel.

2. The method as claimed in claim 1, wherein, when M is 48, the basic orthogonal sequence is formed in a Galois field and represents {01, 22, 46, 52, 42, 41, 26, 50, 05, 33, 62, 43, 63, 65, 32, 40, 04, 11, 23, 61, 21, 24, 13, 60, 06, 55, 31, 25, 35, 36, 51, 20, 02, 44, 15, 34, 14, 12, 45, 30, 03, 66, 54, 16, 56, 53, 64, 10}.

3. A method of allocating sub-channel signal interleaving patterns to Base Stations (BSs) forming a wireless communication system capable of dividing a frequency band into a plurality of sub-carriers and including a plurality of sub-channels, which are a set of predetermined adjacent sub-carriers, the method comprising the steps of:

creating a basic orthogonal sequence having a length identical to a number of the sub-carriers forming a sub-channel;

creating a plurality of sequences having lengths identical to the length of the basic orthogonal sequence by applying, to the basic orthogonal sequence, a predetermined offset and a predetermined number of cyclic shifting;

selecting a predetermined number of sequences corresponding to a number of the BSs from among the plurality of sequences; and allocating the selected sequences, wherein the step of applying the predetermined offset and the cyclic-shifting is determined according to:

$$P_f^g(j) = \begin{cases} P_f(j) + g & P_f(j) + g \neq 0 \\ g & P_f(j) + g = 0 \end{cases}$$

wherein, $P_f^g(j)$ is a $j^{th}$ element of a sequence, $P_f(j)$ represents a $j^{th}$ element of a cyclic shift orthogonal sequence, which is created through cyclic-shifting the basic orthogonal sequence in a left direction by f times, and f and g, which are the predetermined offset, are determined according to:

$$f = c\_id \bmod PERM$$

$$g = \left(\left\lfloor \frac{c\_id}{PERM} \right\rfloor\right) \bmod OFFSET$$

wherein, PERM represents M which is a number of the sub-carriers forming the sub-channel, OFFSET represents M+1, $\lfloor x \rfloor$ represents a maximum integer value, which is not larger than x, and c_id represents an index of the BS.

4. The method as claimed in claim 3, wherein, when M is 48, the basic orthogonal sequence is formed in a Galois field and represents {01, 22, 46, 52, 42, 41, 26, 50, 05, 33, 62, 43, 63, 65, 32, 40, 04, 11, 23, 61, 21, 24, 13, 60, 06, 55, 31, 25, 35, 36, 51, 20, 02, 44, 15, 34, 14, 12, 45, 30, 03, 66, 54, 16, 56, 53, 64, 10}.

5. A method of allocating sub-channel signal interleaving patterns to Base Stations (BSs) forming a wireless communication system capable of dividing a frequency band into a plurality of sub-carriers and including a plurality of sub-channels, which are a set of predetermined adjacent sub-carriers, the method comprising the steps of:

creating a basic orthogonal sequence having a length identical to a number of the sub-carriers forming a sub-channel;

creating a plurality of sequences having lengths identical to the length of the basic orthogonal sequence by applying, to the basic orthogonal sequence, a predetermined offset and a predetermined number of cyclic shifting;

selecting a predetermined number of sequences corresponding to a number of the BSs from among the plurality of sequences; and allocating the selected sequences, wherein the step of applying the predetermined offset and the cyclic-shifting is determined according to:

$$P_f^g(j) = \begin{cases} P_f(j) + g & P_f(j) + g \neq 0 \\ g & P_f(j) + g = 0 \end{cases}$$

wherein, $P_f^g(j)$ is a $j^{th}$ element of a sequence, $P_f(j)$ represents a $j^{th}$ element of a cyclic shift orthogonal sequence, which is created through cyclic-shifting the basic orthogonal sequence in a left direction by f times, and f and g, which are the predetermined offset, are determined according to:

$$f = \left(\left\lfloor \frac{c\_id}{OFFSET} \right\rfloor\right) \bmod PERM$$

$$g = c\_id \bmod OFFSET$$

wherein, PERM represents M which is a number of the sub-carriers forming the sub-channel, OFFSET represents M+1, $\lfloor x \rfloor$ represents a maximum integer value, which is not larger than x, and c_id represents an index of the BS.

6. The method as claimed in claim 5, wherein, when M is 48, the basic orthogonal sequence is formed in a Galois field and represents {01, 22, 46, 52, 42, 41, 26, 50, 05, 33, 62, 43, 63, 65, 32, 40, 04, 11, 23, 61, 21, 24, 13, 60, 06, 55, 31, 25, 35, 36, 51, 20, 02, 44, 15, 34, 14, 12, 45, 30, 03, 66, 54, 16, 56, 53, 64, 10}.

7. A method of allocating data symbols sub-channel signal interleaving patterns by a transmitter in a wireless communication system having a plurality of sub-carriers and including a plurality of sub-channels, which are a set of predetermined adjacent sub-carriers, the method comprising the steps of:

creating, by the transmitter, a sequence having length identical to the length of a basic sequence which has a length identical to a number of data sub-carriers forming a sub-channel by applying, to the basic sequence, a predetermined offset and a predetermined number of cyclic shifting; and allocating, by the transmitter, data symbols onto the data sub-carriers of the sub-channel according to the created sequence, wherein the step of applying the predetermined offset after and the cyclic-shifting is determined according to:

$$P_f^g(j) = \begin{cases} P_f(j) + g & P_f(j) + g \neq 0 \\ g & P_f(j) + g = 0 \end{cases}$$

wherein, $P_f^g(j)$ is a $j^{th}$ element of a sequence, $P_f(j)$ represents a $j^{th}$ element of a cyclic shift sequence, which is created though cyclic-shifting the basic sequence in a left direction by f times, f is a predetermined integer value selected from 0 to M−1, g is the predetermined offset having a predetermined integer value from 0 to M, and M is a number of the data sub-carriers forming the sub-channel.

8. The method as claimed in claim 7, wherein, when M is 48, the basic sequence is formed in a Galois field and represents {01, 22, 46, 52, 42, 41, 26, 50, 05, 33, 62, 43, 63, 65, 32, 40, 04, 11, 23, 61, 21, 24, 13, 60, 06, 55, 31, 25, 35, 36, 51, 20, 02, 44, 15, 34, 14, 12, 45, 30, 03, 66, 54, 16, 56, 53, 64, 10}.

9. The method as claimed in claim 7, wherein the f and g are determined according to:

$$f = c\_id \bmod PERM$$

$$g = \left(\left\lfloor \frac{c\_id}{PERM} \right\rfloor\right) \bmod OFFSET$$

wherein, PERM represents M which is a number of the data sub-carriers forming the sub-channel, OFFSET represents M+1, $\lfloor x \rfloor$ represents a maximum integer value, which is not larger than x, and c_id represents an index value corresponding to the BS.

* * * * *